(12) United States Patent
Nagata et al.

(10) Patent No.: US 10,779,170 B2
(45) Date of Patent: Sep. 15, 2020

(54) BASE STATION, MOBILE STATION AND RADIO COMMUNICATION METHOD

(71) Applicant: NTT DOCOMO, INC., Tokyo (JP)

(72) Inventors: Satoshi Nagata, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 9 days.

(21) Appl. No.: 16/085,188

(22) PCT Filed: Mar. 14, 2017

(86) PCT No.: PCT/JP2017/010252
§ 371 (c)(1),
(2) Date: Sep. 14, 2018

(87) PCT Pub. No.: WO2017/159695
PCT Pub. Date: Sep. 21, 2017

(65) Prior Publication Data
US 2019/0075490 A1    Mar. 7, 2019

(30) Foreign Application Priority Data
Mar. 15, 2016 (CN) .......................... 2016 1 0147071

(51) Int. Cl.
*H04W 24/04* (2009.01)
*H04W 48/10* (2009.01)
(Continued)

(52) U.S. Cl.
CPC ........... *H04W 24/04* (2013.01); *H04L 1/0031* (2013.01); *H04W 4/70* (2018.02); *H04W 28/06* (2013.01);
(Continued)

(58) Field of Classification Search
CPC .... H04L 1/0031; H04W 24/04; H04W 28/06; H04W 48/10; H04W 48/16; H04W 4/06; H04W 4/70
See application file for complete search history.

(56) References Cited

U.S. PATENT DOCUMENTS

2015/0296518 A1* 10/2015 Yi ...................... H04W 72/042
  370/336
2017/0201393 A1*  7/2017 Gaal .................... H04L 1/0606
(Continued)

FOREIGN PATENT DOCUMENTS

CN    107040561 A  *  8/2017  ............. H04L 29/08
WO    2015188848 A1    12/2015

OTHER PUBLICATIONS

Xue et al., "Method and Apparatus of Synchronization Operatfon of Cellular Internet of Things Networks", Mar. 14, 2016, Samsung Electronics, U.S. Appl. No. 62/307,818, pp. 1-11, Total pp. 12 (Year: 2016).*

(Continued)

*Primary Examiner* — Un C Cho
*Assistant Examiner* — Shah M Rahman
(74) *Attorney, Agent, or Firm* — Osha Liang LLP

(57) ABSTRACT

The present invention is designed to provide a master information block (MIB) suitable for an NB-IoT communication system. A base station according to an embodiment of the present invention includes a generation section that generates a master information block (MIB) including parameters selected based on an operation mode during narrow band communication, and a transmission section that transmits the MIB.

11 Claims, 4 Drawing Sheets

(51) Int. Cl.
 *H04W 48/16* (2009.01)
 *H04W 4/70* (2018.01)
 *H04L 1/00* (2006.01)
 *H04W 28/06* (2009.01)
 *H04W 4/06* (2009.01)

(52) U.S. Cl.
 CPC ........... *H04W 48/10* (2013.01); *H04W 48/16* (2013.01); *H04W 4/06* (2013.01)

(56) References Cited

U.S. PATENT DOCUMENTS

| | | | |
|---|---|---|---|
| 2017/0208592 A1* | 7/2017 | Rico Alvarino | H04W 72/087 |
| 2017/0237584 A1* | 8/2017 | Yan | H04L 27/2613 370/330 |
| 2017/0251443 A1* | 8/2017 | Shin | H04L 5/001 |
| 2017/0251455 A1* | 8/2017 | Shin | H04L 5/001 |
| 2017/0265156 A1* | 9/2017 | Xue | H04L 5/0092 |
| 2018/0007543 A1* | 1/2018 | Lee | H04L 5/0053 |
| 2018/0206253 A1* | 7/2018 | Yun | H04L 5/0091 |
| 2018/0213468 A1* | 7/2018 | Chatterjee | H04L 5/0053 |
| 2018/0241495 A1* | 8/2018 | Xue | H04J 11/0083 |
| 2018/0249509 A1* | 8/2018 | Yi | H04W 48/18 |
| 2018/0316464 A1* | 11/2018 | Stern-Berkowitz | H04L 1/0034 |
| 2019/0028221 A1* | 1/2019 | Ratasuk | H04L 5/0048 |

OTHER PUBLICATIONS

WI rapporteur (Ericsson); "RAN1 agreements for Rel-13 NB-IoT"; 3GPP TSG-RAN WG1 Meeting #84 R1-161548; St. Julian's, Malta, Feb. 15-19, 2016 (11 pages).

Extended European Search Report issued in the counterpart European Patent Application No. 17766693.0, dated Nov. 6, 2018 (12 pages).

Ericsson; "NB-Iot-NB-MIB content and design considerations"; 3GPP TSG-RAN1#84 R1-160440; St. Julian's, Malta, Feb. 15-19, 2016 (4 pages).

International Search Report issued in PCT/JP2017/010252 dated May 16, 2017 (2 pages).

Written Opinion of the International Searching Authority issued in PCT/JP2017/010252 dated May 16, 2017 (4 pages).

ZTE, MediaTek; "WF on Bitwidth of MIB content for NB-IoT"; 3GPP TSG RAN WG1 Meeting #84, R1-161231; St Julian's, Malta; Feb. 15-19, 2016 (13 pages).

NTT DOCOMO; "Remaining issues of NB-MIB design"; 3GPP TSG RAN WG1 NB-IoT Ad-Hoc Meeting, R1-161951; Sophia Antipolis, France; Mar. 22-24, 2016 (5 pages).

Office Action issued in European Application No. 17766693.0; Dated May 26, 2020 (6 pages).

* cited by examiner

BASE STATION, MOBILE STATION AND RADIO COMMUNICATION METHOD

TECHNICAL FIELD

The present invention relates to the field of radio communication, and, more specifically, the present invention relates to a base station, a mobile station and a radio communication method for use in radio communication systems.

BACKGROUND ART

Narrow band communication (also referred to as "Narrow Band Internet of Thing," "NB-IoT" or the like) technology has already become an important technology for use in 4G and 5G communication systems. Unlike LTE (Long Term Evolution) communication systems in which communication is performed using a wide band, in the NB-IoT communication system, the base station communicates with the mobile station in a super narrow band of 180 kHz. Thanks to the NB-IoT technology, the indoor network coverage was improved, a large amount of low throughput equipment, low delay sensitivity, ultralow equipment cost, low equipment power consumption, an optimized network frame structure is supported.

In the NB-IoT communication system, the key information used to initialize the cell access is included in the master information block (also referred to as "MIB") and is broadcast to the mobile station. Meanwhile, the NB-IoT communication system can operate in various modes, if the MIB used in the NB-IoT communication system is generated by a scheme similar to that in LTE communication systems, the system signaling overhead becomes very large. To reduce the signaling overhead, it has already been proposed to delete some key information reported using the MIB. However, if the key information to be reported to the mobile station is reduced, the performance of the mobile station will be degraded.

SUMMARY OF INVENTION

Technical Problem

In view of the above problem, a master information block (MIB) suitable for the NB-IoT communication system is desired.

Solution to Problem

A base station according to one aspect of the present invention includes a generation section that generates a master information block (MIB) including a parameter selected based an operation mode during narrow band communication and a transmission section that transmits the MIB.

A master information block (MIB) generating method executed by a base station according to one aspect of the present invention includes determining current information on each parameter of a plurality of parameters, joint-encoding the current information on each determined parameter, and generating the MIB based on the result of the joint-encoding.

A master information block (MIB) generating method executed by a mobile station according to one aspect of the present invention includes receiving an MIB transmitted from a base station, obtaining one cord word, and determining current information on each parameter of a plurality of parameters based on the obtained codeword.

A base station according to one aspect of the present invention includes a determining section configured to determine parameter values of a plurality of parameters, an encoding section configured to joint-encode the determined parameter values of a plurality of parameters, and a generation section configured to generate a MIB based on the result of the joint-encoding.

A mobile station according to one aspect of the present invention includes a receiving section configured to receive an MIB transmitted from a base station and obtain one cord word, and a d determining section configured to determine parameter values of a plurality of parameters based on the obtained codeword.

Advantageous Effects of Invention

It is possible to provide a master information block (MIB) suitable for the NB-IoT communication system.

DESCRIPTION OF EMBODIMENTS

Figure 1:
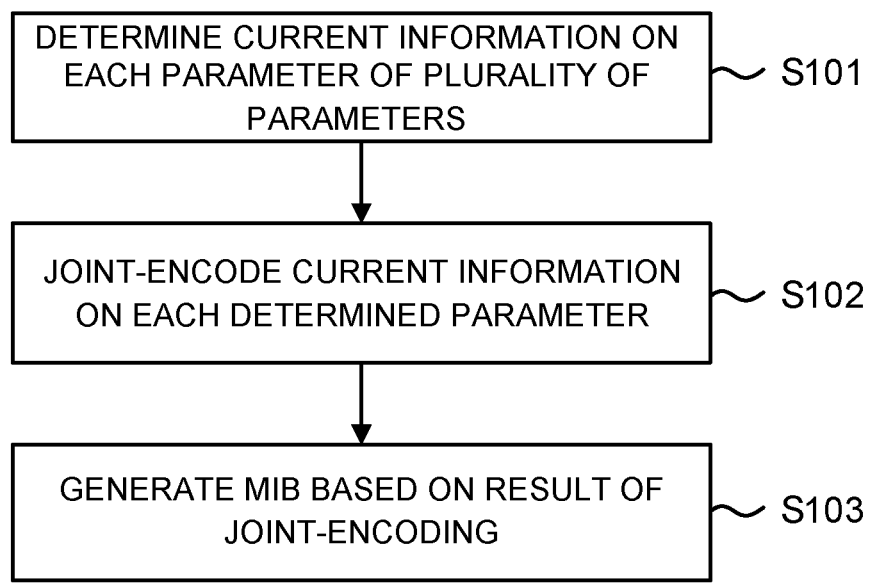
FIG. 1 is a flowchart showing a master information block (MIB) generating method executed by a base station according to one embodiment of the present invention.

Hereinafter, with reference to the accompanying drawings, a master information block generating method, a master information block processing method, a base station and a mobile station according to an embodiment of the present invention will be described. In the drawings, the same reference numerals indicate the same contents throughout. It should be noted that one embodiment described below is merely illustrative and should not be construed as limiting the scope of the invention. Note that the UE described here is, for example, various types of user terminals including a mobile terminal (or called "mobile station") and a fixed terminal, and, in the following description, for convenience, "UE" and "mobile station" will be interchangeably used.

One embodiment of the present invention can be used in the NB-IoT communication system. Key information used to initialize cell access at the base station is included in the MIB and broadcasted to the UE so that the UE can make radio access. In a radio communication system such as LTE or LTE-Advanced, the contents of the MIB to be transmitted to the UE are defined. More specifically, in the LTE and LTE-Advanced radio communication system, the UE needs to obtain information on a plurality of parameters when gaining radio access, and the base station encodes each piece of parameter information and arranges the codewords in each parameter in a field corresponding to the parameter in the MIB. However, if the MIB used in the NB-IoT communication system is generated in a scheme similar to that in LTE communication systems, the signaling overhead by the MIB becomes excessive for the NB-IoT communication system.

One embodiment of the present invention improves the contents of the MIB in the NB-IoT communication system. An embodiment of the present invention will now be described with reference to the accompanying drawings.

First, referring to FIG. 1, a master information block (MIB) generating method executed by a base station according to one embodiment of the present invention will be described. FIG. 1 is a flowchart showing an MIB generating method 100 executed by a base station according to one embodiment of the present invention. As shown in FIG. 1, current information on each parameter of a plurality of parameters is determined in step S101. As stated above, in the base station, the MIB includes the information on the key parameters used to initialize the cell access so that the UE can make radio access. In step S101, the current information on these key parameters is determined. According to one example of the present invention, the current information on each parameter indicates the current value of the parameter or that the parameter is not currently required.

For example, the base station in the NB-IoT communication system operates in various operation modes according to the positional relationship between the communication frequency band used in NB-IoT communication system and the communication frequency band used in LTE communication systems, and in the NB-IoT communication system, information required for the UE to access a cell is different between different operation modes. Accordingly, the plurality of parameters may include an operation mode parameter indicating the current operation mode of the base station. In addition to the operation mode parameter, the plurality of parameters may include another key parameter used for initializing the cell access. In step S101, the current operation mode at the time of the narrow-band communication of the base station is determined.

Subsequently, the candidate value corresponding to the current operation mode, which is determined from the candidate values of the operation mode parameter, is selected as the current value of the operation mode parameter. Meanwhile, it is determined based on the determined operation mode whether or not other parameters of the plurality of parameters are currently required. If another parameter among the plurality of parameters is required, the current value of the other parameter is selected from other candidate values of necessary parameters.

Figure 2A:
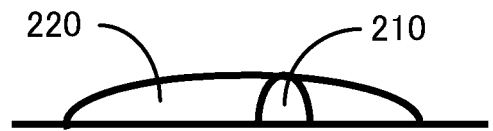
FIG. 2a is a schematic diagram showing an in-band operation mode according to one embodiment of the present invention.
Figure 2B:
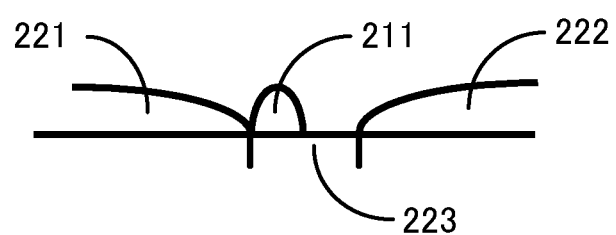
FIG. 2b is a schematic diagram showing a guard-band operation mode according to one embodiment of the present invention.
Figure 2C:
FIG. 2c is a schematic diagram showing a stand-alone operation mode according to one embodiment of the present invention.

Hereinafter, referring to FIG. 2a to FIG. 2c, a schematic diagram of various operation modes of the base station in the NB-IoT communication system according to one embodiment of the present invention will be described. Specifically, FIG. 2a is a schematic diagram showing an in-band operation mode according to one embodiment of the present invention. As shown in FIG. 2a, in the in-band operation mode, the frequency band 210 used for the NB-IoT communication system is arranged in the frequency band 220 used for LTE communication systems. FIG. 2b is a schematic diagram showing a guard-band operation mode according to one embodiment of the present invention. In the example shown in FIG. 2b, LTE communication systems communicate using frequency bands 221 and 222, and the frequency band 223 serves as a guard period for LTE communication systems. Note that the NB-IoT communication system communicates using the frequency band 211. As shown in FIG. 2b, the frequency band 211 used for the NB-IoT communication system is located within the guard period of LTE communication systems. FIG. 2c is a schematic diagram showing a stand-alone operation mode according to one embodiment of the present invention. As shown in FIG. 2c, in the stand-alone operation mode, the frequency band 212 used for the NB-IoT communication system is arranged within the frequency band 230 used for the GSM (Global System for Mobile communications) communication system independently of the frequency band (not shown) used for LTE communication systems.

For example, the operation mode parameter has a candidate value representing an in-band operation, a candidate value representing a guard-band operation mode, and a candidate value representing a stand-alone operation mode. When the base station performs narrow-band communication in the in-band operation mode, the base station selects candidate values corresponding to the in-band operation mode as the current value of the operation mode parameter from the candidate values of the operation mode parameter. Meanwhile, the base station determines parameters other than the operation mode parameter necessary for the in-band operation mode, and determines the current value of the necessary parameters.

Other key parameters used to initialize the cell access, apart from the operating mode parameters, further include cell reference signal (CRS: Cell-specific Reference Signal) port parameters, channel raster parameters, etc. Note that, in addition to the operating mode parameters, another key parameter used to initialize the cell access preferably further includes the same physical cell indicator, CRS sequence parameter, etc., so that the performance of the UE can be ensured by the UE performing detection using the CRS. The key parameters used to initialize the cell access in the NB-IoT communication system differ between different operating modes.

For example, in the in-band mode of operation, the physical cell indicator of the NB-IoT system may be the same as or different from the physical cell indicator of LTE. Whether or not the physical cell indicator of the current NB-IoT system is the same as the physical cell indicator of LTE can be reported to the UE via the same physical cell indicator.

Meanwhile, in guard-band operation mode and stand-alone operation mode, the CRS transmitted in LTE communication systems does not interfere with demodulation at the UE. Therefore, the UE does not need to obtain information on the parameters associated with the CRS. That is, the same physical cell indicator, CRS port parameter, CRS sequence parameter, etc. are not required.

If the determined operation mode is the in-band operation mode and the physical cell indicator of the NB-IoT system is different from the physical cell indicator of LTE, the base station further has to report the number of antenna ports for CRS transmission to the UE via CRS port parameters so that the UE in the NB-IoT system performs operations such as speed matching. Meanwhile, if the determined operation mode is the in-band operation mode and the physical cell indicator of the NB-IoT system is the same as the physical cell indicator of LTE, the NB-IoT system implicitly acknowledges that the number of CRS ports is the same as the number of NB-RS ports, and the UE can obtain the CRS port based on other parameters (for example, the reference signal (NB-RS) of the NB-IoT system). Therefore, the base station does not need to transmit the information on the CRS port parameters to the UE. Also in the case of guard-band operation mode and stand-alone operation mode, the communication frequency band of the NB-IoT system does not overlap with the communication frequency band of the LTE system as described above, and thus the CRS port parameter is unnecessary.

Also, for example, in the case of in-band operation mode and guard-band operation mode, the base station needs to report the channel raster offset frequency to the UE using the channel raster parameter. Specifically, the channel raster parameter represents an offset from the center frequency point of the resource block currently occupied by the NB-IoT system to the n*100 KHz frequency point which is closest to the center frequency point. Here, n is a natural number, and, in the stand-alone operation mode, when the UE gains radio access, it is not necessary to use channel raster parameters.

Note that when the determined operation mode is the in-band operation mode and the physical cell indicator of the NB-IoT system is the same as the physical cell indicator of LTE, the UE of the NB-IoT system needs to demodulate using the CRS of the LTE system, and thus the base station needs to indicate the corresponding CRS sequence information. That is, the base station needs to report CRS sequence parameters to the UE so that the UE can determine the current CRS sequence value in the LTE system based on the CRS sequence parameter. According to one example of the present invention, the CRS sequence parameters are the index of the physical resource block (PRB) of the LTE system, the physical resource block index indicating the communication bandwidth (BW), and the bandwidth parameter. Table 1 schematically shows candidate values of physical resource block index and bandwidth parameter.

TABLE 1

Candidate values of physical resource block index and bandwidth parameter

| BW (Unit: MHz) | PRB Index (starting from 0) | Channel raster (Unit: KHz) |
|---|---|---|
| 3 | 2 | |
| 5 | 2, 7 | −7.5 |
| 15 | 2, 7, 12, 17, 22, 27, 32 | |
| 3 | 12 | |
| 5 | 17, 22 | +7.5 |
| 15 | 42, 47, 52, 57, 62, 67, 72 | |
| 10 | 4, 9, 14, 19 | −2.5 |
| 20 | 4, 9, 14, 19, 24, 29, 34, 39, 44 | |
| 10 | 30, 35, 40, 45 | +2.5 |
| 20 | 55, 60, 65, 70, 75, 80, 85, 90, 95 | |

Alternatively, the UE may determine the current CRS sequence value in the LTE system based on the offset between resource blocks for transmitting the MIB and the center frequency in the communication frequency band of the base station. Thus, according to another example of the present invention, the CRS sequence parameter may be a frequency offset parameter representing the offset between resource blocks for transmitting the MIB and the center frequency in the communication frequency band of the base station.

Table 2-1 and Table 2-2 schematically show the correspondence between the frequency offset parameter, the physical resource block index and the bandwidth parameter. As shown in Table 2-1 and Table 2-2, different system bandwidths (BW) and different PRB indices may be associated with the same frequency offset parameter, and may be associated with the same CRS sequence value. Therefore, by using the frequency offset parameter instead of the physical resource block index and the bandwidth parameter, the information on the CRS sequence value can be reported to the UE, and the signaling overhead of the system can be further reduced.

TABLE 2-1

Correspondence table among frequency offset parameter, PRB index, and bandwidth parameter

| Frequency offset parameter (Unit: PRB) | BW (Unit: MHz) | PRB index | Channel raster (Unit: KHz) |
|---|---|---|---|
| +5 | 3 | 12 | +7.5 |
| | 5 | 22 | |
| | 15 | 42 | |
| +10 | 5 | 17 | |
| | 15 | 47 | |
| +15 | 15 | 52 | |
| +20 | 15 | 57 | |
| +25 | 15 | 62 | |
| +30 | 15 | 67 | |
| +35 | 15 | 72 | |
| −5 | 3 | 2 | −7.5 |
| | 5 | 7 | |
| | 15 | 32 | |
| −10 | 5 | 2 | |
| | 15 | 27 | |
| −15 | 15 | 22 | |
| −20 | 15 | 17 | |
| −25 | 15 | 12 | |
| −30 | 15 | 7 | |
| −35 | 15 | 2 | |

TABLE 2-2

Correspondence table among frequency offset parameter, PRB index, and bandwidth parameter (continuation)

| Frequency offset parameter (Unit: PRB) | +/− | BW (Unit: MHz) | PRB index | Channel raster (Unit: KHz) |
|---|---|---|---|---|
| 6 | +Δ | 10 | 30 | +2.5 |
| | +Δ | 20 | 55 | |
| 11 | +Δ | 10 | 35 | |
| | +Δ | 20 | 60 | |
| 16 | +Δ | 10 | 40 | |
| | +Δ | 20 | 65 | |
| 21 | +Δ | 10 | 45 | |
| | +Δ | 20 | 70 | |
| 26 | +Δ | 20 | 75 | |
| 31 | +Δ | 20 | 80 | |
| 36 | +Δ | 20 | 85 | |
| 40 | +Δ | 20 | 90 | |
| 45 | +Δ | 20 | 95 | |
| 6 | −Δ | 10 | 19 | −2.5 |
| | −Δ | 20 | 44 | |
| 11 | −Δ | 10 | 14 | |
| | −Δ | 20 | 30 | |
| 16 | −Δ | 10 | 9 | |
| | −Δ | 20 | 34 | |
| 21 | −Δ | 10 | 4 | |
| | −Δ | 20 | 29 | |
| 26 | −Δ | 20 | 24 | |
| 31 | −Δ | 20 | 19 | |
| 36 | −Δ | 20 | 14 | |
| 40 | −Δ | 20 | 9 | |
| 45 | −Δ | 20 | 4 | |

As shown in Table 2-1 and Table 2-2, there is a correspondence between CRS sequence parameters (i.e., frequency offset parameter or PRB index, and bandwidth parameter) and channel raster parameters. In other words, the UE can derive channel raster parameters based on CRS sequence parameters. Therefore, when the base station transmits the information on the CRS sequence parameter to the UE, the base station does not have to transmit the information on the channel raster parameter to the UE. That is, channel raster parameters are not required.

Accordingly, in step S101, if the determined operation mode is the in-band operation mode, first, it is determined to select the current value of the same physical cell indicator from the candidate values of the same physical cell indicator. Subsequently, it is determined based on the determined current value of the same physical cell indicator whether the CRS port parameter is required or the CRS sequence parameter is required. Further, the current value of the CRS port parameter is selected from the candidate values of the CRS port parameters or the current value of the CRS sequence parameter is selected from the candidate values of the CRS sequence parameter. Note that when the operation mode is the in-band operation mode, the current value of the same physical cell indicator is selected from among the candidate values of the same physical cell indicator, and then whether or not the channel raster parameter is necessary is determined based on the determined current value of the same physical cell indicator. Meanwhile, when the determined operation mode is the in-band operation mode, the current value of the channel raster parameter may be selected from the candidate values of the channel raster parameter. Further, when the determined operation mode is the stand-alone operation mode, it may be determined that the channel raster parameter is not necessary. Furthermore, if the determined operation mode is the guard-band operation mode or the stand-alone operation mode, it may further be determined that the same physical cell indicator, the CRS port parameter and the CRS sequence parameter are not required.

Returning to FIG. 1, in step S102, the current information on each determined parameter is joint-encoded. In step S102, a codeword corresponding to the current information on each determined parameter is selected from the codeword group. According to one example of the present invention, more specifically, each codeword in the codeword group represents one type of combination of candidate states of each parameter of the plurality of parameters. The candidate state of each parameter indicates a candidate value of the parameter, or in the specific case, indicates that the parameter is not required. Subsequently, in step S103, an MIB is generated based on the result of the joint-encoding.

For example, as described above, the plurality of parameters include an operation mode parameter, a CRS port parameter, a channel raster parameter, the same physical cell indicator, a CRS sequence parameter, and the like. The operation mode parameters have "in-band," which is a candidate value representing the in-band operation mode, "guard band," which is a candidate value representing the guard-band operation mode, and "stand-alone," which is a candidate value representing the stand-alone operation mode. The same physical cell indicator has "T" as a candidate value representing the same physical cell and "F" as a candidate value representing a different physical cell. The channel raster parameter has candidate values "±2.5 (KHz)" and "±7.5 (KHz)" representing the frequency offset. The CRS port parameters have "1 Port," which is a candidate value representing one CRS port antenna port, "2 Port," which is a candidate value representing two CRS port antenna ports, and "4 Port," which is a candidate value representing four CRS port antenna ports. Table 3 schematically shows a combination of some codewords in the codeword group and the candidate state of each parameter corresponding to each codeword.

TABLE 3

Correspondence table between codeword and combination of candidate state of each parameter

| Codeword | Operation mode parameter | Same physical cell indicator | CRS port parameter | Channel raster parameter (Unit: KHz) | Physical resource block index and bandwidth parameter |
|---|---|---|---|---|---|
| 000000 | In band | F | 1 Port | 2.5 | × |
| 000001 | In band | F | 1 Port | 7.5 | × |
| 001100 | In band | T | × | −2.5 | 4; 10 MHz |
| 101001 | In band | T | × | −7.5 | 7; 5 MHz |
| 111101 | Guard band | × | × | −7.5 | × |
| 111110 | Stand alone | × | × | × | × |

As shown in Table 3, each codeword in the codeword group represents one kind of combination of candidate states of each parameter of a plurality of parameters. Here, "×" indicates a parameter which is not required within the combination. Accordingly, in step S102, a codeword corresponding to the current information on each determined parameter is selected from the codeword group, so that the current information on each determined parameter is joint-encoded. Accordingly, it is possible to represent current information on a plurality of parameters using one codeword.

In the case where candidate states of a plurality of parameters are arranged and a corresponding codeword is generated like the relation between the parameters described with reference to step S101, a candidate state of the operation mode parameter is firstly determined. Subsequently, candidate states of other parameters among the plurality of parameters may be determined based on the candidate state of the operation mode parameter. In other words, the codeword in the codeword group represents a combination formed according to the order such that candidate states of other parameters among a plurality of parameters are determined based on candidate states of operation mode parameters.

Furthermore, if the candidate state of the operation mode parameter is the in-band operation mode, the codeword in the codeword group represents a combination formed according the order such that a candidate state of the same physical cell indicator is determined based on the candidate state of the operation mode parameter, and then the cell reference signal port parameter and the CRS sequence parameter are determined based on the candidate state of the same physical cell indicator.

In the above-described master information block generating method according to one embodiment of the present invention, the parameter values of a plurality of parameters reported to the mobile station via the MIB are joint-encoded. Therefore, it is possible to avoid degradation of the performance of the mobile station while effectively reducing the load of the master information block in the radio communication system. According to the master information block generating method according to one embodiment of the present invention described above, even in different operation modes used in the NB-IoT communication system, MIBs of the same format can be generated.

Figure 3:
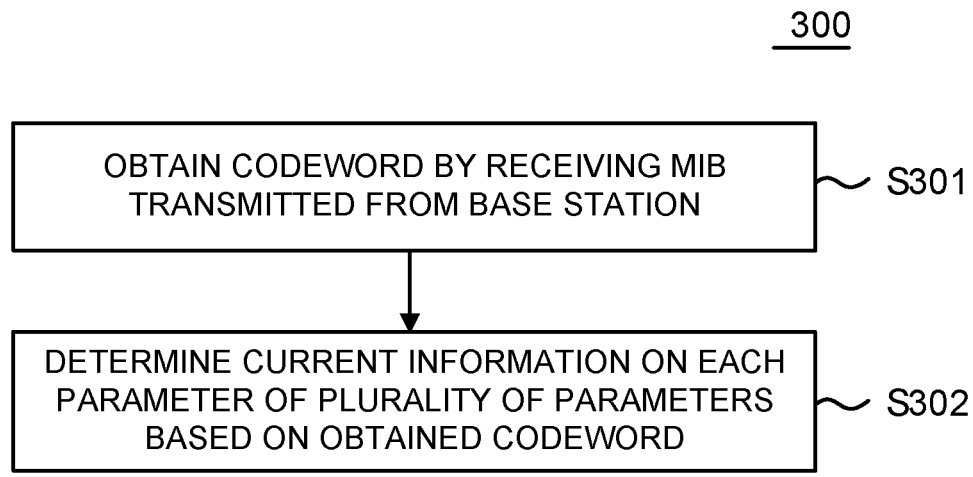
FIG. 3 is a flowchart showing a master information block processing method executed by a mobile station according to one embodiment of the present invention.

Hereinafter, referring to FIG. 3, a method of processing a master information block executed by a mobile station according to one embodiment of the present invention will be described. FIG. 3 is a flowchart showing a master information block processing method 300 executed by the mobile station. As shown in FIG. 3, in step S301, the mobile station receives the MIB transmitted from the base station and obtains one codeword. The codewords acquired based on the MIB may be included in a codeword group pre-stored in the UE. Specifically, each codeword in the codeword group pre-stored in the UE represents one type of combination of candidate states of each parameter of the plurality of parameters. The candidate state of each parameter indicates a candidate value of the parameter, or in a specific case, indicates that the parameter is not required. Codewords in the codeword group have been described in detail above with reference to Table 3, and therefore duplicate descriptions are omitted here.

Subsequently, in step S302, the current information on each parameter of the plurality of parameters is determined based on the acquired codeword. According to one example of the present invention, in step S302, a combination of candidate states of a plurality of parameters corresponding to the acquired codeword is determined and subsequently candidate state of parameters in the determined combination is taken as the current information on the parameter concerned.

For example, the plurality of parameters include an operation mode parameter, and the operation mode parameters have "in-band," which is a candidate value representing the in-band operation mode, "guard band," which is a candidate value representing the guard-band operation mode, and "stand alone," which is a candidate value representing the alone operation mode. In step S302, a candidate state of an operation mode parameter in a combination of candidate states of a plurality of parameters corresponding to the acquired codeword is determined, and a candidate state of a parameter in the determined combination is taken as the current information on the parameter concerned.

In addition, in step S302, the current information on other parameters may be further derived based on the current information on some of the plurality of parameters. For example, the current information on the channel raster parameter may be derived based on the current information on the CRS sequence parameter among a plurality of parameters. Detailed description has been made with reference to Step S102, Table 2-1, and Table 2-2 above and thus duplicate descriptions are omitted here.

In the master information block processing method according to one embodiment of the present invention described above, parameter values of a plurality of parameters are obtained by decoding the joint-encoded codeword in the received MIB. Therefore, in the radio communication system, it is possible to avoid deterioration of the performance of the mobile station while effectively reducing the load of the master information block. In addition, according to the master information block processing method according to one embodiment of the present invention described above, even in different operation modes of the NB-IoT communication system, it is possible to receive the MIB of the same format transmitted from the base station.

Figure 4:
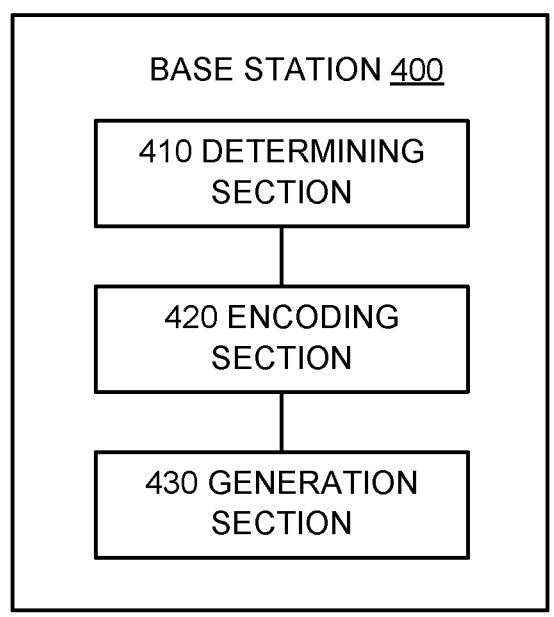
FIG. 4 is a block diagram showing a base station according to one embodiment of the present invention.

Hereinafter, referring to FIG. 4, a base station according to one embodiment of the present invention will be described. FIG. 4 is a block diagram showing a base station 400 according to one embodiment of the present invention. As shown in FIG. 4, the base station 400 includes a determining section 410, an encoding section 420, and a generation section 430. In addition to these three components, the base station 400 may further include another component (for example, transmission section, receiving section, etc.). However, since these components are not related to the contents of one embodiment of the present invention, illustration and description thereof will be omitted here. Since the specific details of the following operations performed by the base station 400 according to one embodiment of the present invention are the same as the details described with reference to FIGS. 1 and 2 in the above description, the description of the same details will be omitted herein to avoid duplication.

As shown in FIG. 4, the determining section 410 determines current information on each parameter of a plurality of parameters. As described above, in the base station, the MIB includes information on the key parameters used to initialize the cell access so that the UE can make radio access. The determining section 410 can determine current information on these key parameters. According to one example of the present invention, current information on each parameter indicates the current value of the parameter or indicates that the parameter is not currently required.

For example, the base station in the NB-IoT communication system operates in various operation modes according to the positional relationship between the communication frequency band used in NB-IoT communication system and the communication frequency band used in LTE communication systems, and in the NB-IoT communication system, information required for the UE to access a cell is different between different operation modes. Accordingly, the plurality of parameters include an operation mode parameter indicating the current operation mode of the base station, and another key parameter used for initializing the cell access in addition to the operation mode parameter. The determining section 410 first determines the current operation mode at the time of the narrow-band communication of the base station. Subsequently, the determining section 410 selects the candidate value corresponding to the current operation mode, which is determined from among the candidate values of the operation mode parameter, as the current value of the operation mode parameter. Meanwhile, the determining section 410 determines based on the determined operation mode whether or not other parameters of the plurality of parameters are currently required. If another parameter among the plurality of parameters is required, the determining section 410 selects the current value of the other parameter from other candidate values of necessary parameters.

For example, the operation mode parameter has a candidate value representing an in-band operation, a candidate value representing a guard-band operation mode, and a candidate value representing a stand-alone operation mode. When the base station performs narrow-band communication in the in-band operation mode, the determining section 410 selects candidate values corresponding to the in-band operation mode as the current value of the operation mode parameter from the candidate values of the operation mode parameter. Meanwhile, the determining section 410 determines parameters other than the operation mode parameter necessary for the in-band operation mode, and determines the current value of the necessary parameters.

Other key parameters used to initialize the cell access, apart from the operating mode parameters, further include cell reference signal (CRS: Cell-specific Reference Signal) port parameters, channel raster parameters, etc. Note that, in addition to the operating mode parameters, another key parameter used to initialize the cell access preferably further includes the same physical cell indicator, CRS sequence parameter, etc., so that the performance of the UE can be ensured by the UE performing detection using the CRS. The key parameters used to initialize the cell access in the NB-IoT communication system differ between different operating modes.

For example, in the case of the in-band mode of operation, the physical cell indicator of the NB-IoT system may be the same as or different from the physical cell indicator of LTE. Whether or not the physical cell indicator of the current NB-IoT system is the same as the physical cell indicator of LTE can be reported to the UE via the same physical cell indicator.

Meanwhile, in the case of guard-band operation mode and stand-alone operation mode, the CRS transmitted in LTE communication systems does not interfere with demodulation at the UE. Therefore, the UE does not need to obtain information on the parameters associated with the CRS. That is, the same physical cell indicator, CRS port parameter, CRS sequence parameter, etc. are not required.

If the determined operation mode is the in-band operation mode and the physical cell indicator of the NB-IoT system is different from the physical cell indicator of LTE, the base station further needs to report the number of antenna ports for CRS transmission to the UE via CRS port parameters so that the UE in the NB-IoT system performs operations such as speed matching. Meanwhile, if the determined operation mode is the in-band operation mode and the physical cell indicator of the NB-IoT system is the same as the physical cell indicator of LTE, the NB-IoT system implicitly acknowledges that the number of CRS ports is the same as the number of NB-RS ports, and the UE can obtain the CRS port based on other parameters (for example, the reference signal (NB-RS) of the NB-IoT system). Therefore, the base station does not need to transmit the information on the CRS port parameters to the UE. Also in the case of guard-band operation mode and stand-alone operation mode, the communication frequency band of the NB-IoT system does not overlap with the communication frequency band of the LTE system as described above, and therefore the CRS port parameter is unnecessary.

Also, for example, in the case of in-band operation mode and guard-band operation mode, the base station needs to report the channel raster offset frequency to the UE using the channel raster parameter. Specifically, the channel raster parameter represents an offset from the center frequency point of the resource block currently occupied by the NB-IoT system to the n*100 KHz frequency point, which is closest to the center frequency point. Here, n is a natural number, and, in the stand-alone operation mode, when the UE gains radio access, it is not necessary to use channel raster parameters.

Note that when the determined operation mode is the in-band operation mode and the physical cell indicator of the NB-IoT system is the same as the physical cell indicator of LTE, the UE of the NB-IoT system needs to demodulate using the CRS of the LTE system, and thus the base station needs to indicate the corresponding CRS sequence information. That is, the base station needs to report CRS sequence parameters to the UE so that the UE can determine the current CRS sequence value in the LTE system based on the CRS sequence parameter. According to one example of the present invention, the CRS sequence parameters are the index of the physical resource block (PRB) of the LTE system, the physical resource block index indicating the communication bandwidth (BW), and the bandwidth parameter. Alternatively, the UE may determine the current CRS sequence value in the LTE system based on the offset between resource blocks for transmitting the MIB and the center frequency in the communication frequency band of the base station. Thus, according to another example of the present invention, the CRS sequence parameter may be a frequency offset parameter representing the offset between resource blocks for transmitting the MIB and the center frequency in the communication frequency band of the base station. The frequency offset parameter, the physical resource block index and the bandwidth parameter have been schematically shown with reference to Table 1, Table 2-1 and Table 2-2, and therefore detailed descriptions are omitted here.

Note that there is a correspondence between CRS sequence parameters (i.e., frequency offset parameter or PRB index, and bandwidth parameter) and channel raster parameters. In other words, the UE can derive channel raster parameters based on CRS sequence parameters. Therefore, when the base station transmits the information on the CRS sequence parameter to the UE, the base station does not have to transmit the information on the channel raster parameter to the UE.

Accordingly, if the determined operation mode is the in-band operation mode, the determining section 410 first determines to select the current value of the same physical cell indicator from the candidate values of the same physical cell indicator. Subsequently, the determining section 410 determines based on the determined current value of the same physical cell indicator whether the CRS port parameter is required or the CRS sequence parameter is required. Further, the determining section 410 selects the current value of the CRS port parameter from the candidate values of the CRS port parameters or selects the current value of the CRS sequence parameter from the candidate values of the CRS sequence parameter. Note that when the operation mode is the in-band operation mode, the determining section 410 selects the current value of the same physical cell indicator from among the candidate values of the same physical cell indicator, and then determines whether or not the channel raster parameter is necessary based on the determined current value of the same physical cell indicator. Meanwhile, when the determined operation mode is the in-band operation mode, the determining section 410 may select the current value of the channel raster parameter from the candidate values of the channel raster parameter. Further, when the determined operation mode is the stand-alone operation mode, the determining section 410 may determine that the channel raster parameter is not necessary. Furthermore, if the determined operation mode is the guard-band operation mode or the stand-alone operation mode, the determining section 410 may further determine that the same physical cell indicator, the CRS port parameter and the CRS sequence parameter are not required.

The encoding section 420 joint-encodes the current information on each determined parameter. According to one example of the present invention, the encoding section 420 selects a codeword corresponding to the current information on each determined parameter from the codeword group. More specifically, each codeword in the codeword group represents one type of combination of candidate states of each parameter of the plurality of parameters. The candidate state of each parameter indicates a candidate value of the parameter, or in the specific case, indicates that the parameter is not required. The generation section 430 generates an MIB based on the result of the joint-encoding.

For example, as described above, the plurality of parameters include an operation mode parameter, a CRS port parameter, a channel raster parameter, the same physical cell indicator, a CRS sequence parameter, and the like. The operation mode parameters have "In band," which is a candidate value representing the in-band operation mode, "guard band," which is a candidate value representing the guard-band operation mode, and "stand alone," which is a candidate value representing the stand-alone operation mode. The same physical cell indicator has "T" as a candidate value representing the same physical cell and "F" as a candidate value representing a different physical cell. The channel raster parameter has candidate values "±2.5 (KHz)" and "±7.5 (KHz)" representing the frequency offset. The CRS port parameters have "1 Port," which is a candidate value representing one CRS port antenna port, "2 Port," which is a candidate value representing two CRS port antenna ports, and "4 Port," which is a candidate value representing four CRS port antenna ports. Table 3 schematically shows a combination of some codewords in the codeword group and the candidate state of each parameter corresponding to each codeword. The encoding section 420 selects a codeword corresponding to the current information on each determined parameter from the codeword group and thereby joint-encodes the current information on each determined parameter. Accordingly, it is possible to represent current information on a plurality of parameters using one codeword.

In addition, instead of directly indicating the number of CRS ports, the number of CRS ports may be derived by showing the relationship between the number of CRS ports and the number of NB-RS ports. For example, two states may be indicated. In the case of a state indicating that the number of CRS ports is the same as the number of NB-RS ports, the number of CRS ports may be derived from the number of NB-RS ports. In the case of another state indicating that the number of CRS ports is different from the number of NB-RS ports, the number of CRS ports may be a predetermined default value.

In the case where candidate states of a plurality of parameters are arranged and a corresponding codeword is generated, a candidate state of the operation mode parameter is firstly determined. Subsequently, candidate states of other parameters among the plurality of parameters may be determined based on the candidate state of the operation mode parameter. In other words, the codeword in the codeword group represents a combination formed according to the order such that candidate states of other parameters among a plurality of parameters are determined based on candidate states of operation mode parameters.

Furthermore, if the candidate state of the operation mode parameter is the in-band operation mode, the codeword in the codeword group represents a combination formed according the order such that a candidate state of the same physical cell indicator is determined based on the candidate state of the operation mode parameter, and then the cell reference signal port parameter and the CRS sequence parameter are determined based on the candidate state of the same physical cell indicator.

In the above-described base station according to one embodiment of the present invention, the parameter values of a plurality of parameters reported to the mobile station via the MIB are joint-encoded. Therefore, it is possible to avoid degradation of the performance of the mobile station while effectively reducing the load of the master information block in the radio communication system. According to the base station of one embodiment of the present invention described above, even in different operation modes used in the NB-IoT communication system, MIBs of the same format can be generated.

Figure 5:
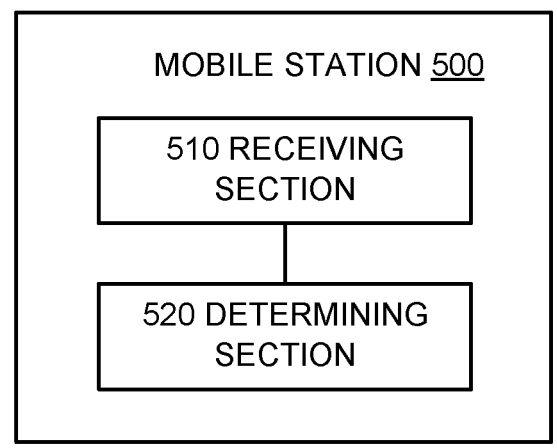
FIG. 5 is a block diagram showing a mobile station according to one embodiment of the present invention.

Hereinafter, a mobile station according to one embodiment of the present invention will be described with reference to FIG. 5. FIG. 5 is a block diagram showing a mobile station 500 according to one embodiment of the present invention. As shown in FIG. 5, the mobile station 500 includes a receiving section 510 and a determining section 520. In addition to these two components, the mobile station 500 may further include other components. However, since these components are not related to the contents of one embodiment of the present invention, illustration and description thereof will be omitted here. Note that since the specific details of the following operations performed by the mobile station 500 according to one embodiment of the present invention are the same as the details described with reference to FIG. 3 in the above description, the description of the same details will be omitted herein to avoid duplication.

As shown in FIG. 5, the receiving section 510 receives the MIB transmitted from the base station and obtains one codeword. The codewords acquired based on the MIB may be included in a codeword group pre-stored in the UE. Specifically, each codeword in the codeword group pre-stored in the UE represents one type of combination of candidate states of each parameter of the plurality of parameters. The candidate state of each parameter indicates a candidate value of the parameter, or in a specific case, indicates that the parameter is not required. Codewords in the codeword group have been described in detail above with reference to Table 3, and therefore duplicate descriptions are omitted here.

Subsequently, the determining section 520 determines the current information on each parameter of the plurality of parameters based on the acquired codeword. According to one example of the present invention, the determining section 520 determines a combination of candidate states of a plurality of parameters corresponding to the acquired codeword and then takes candidate state of parameters in the determined combination as the current information on the parameter concerned.

For example, the plurality of parameters include an operation mode parameter, and the operation mode parameters have "in-band," which is a candidate value representing the in-band operation mode, "guard band," which is a candidate value representing the guard-band operation mode, and "stand alone," which is a candidate value representing the stand-alone operation mode. The determining section 520 determines a candidate state of an operation mode parameter in a combination of candidate states of a plurality of parameters corresponding to the acquired codeword and further takes a candidate state of a parameter in the determined combination as the current information on the parameter concerned.

In addition, the determining section 520 may further derive the current information on other parameters based on the current information on some of the plurality of parameters. For example, the determining section 520 may derive the current information on the channel raster parameter based on the current information on the CRS sequence parameter among a plurality of parameters. Detailed description has been made with reference to Step S102, Table 2-1, and Table 2-2 above, and therefore duplicate descriptions are omitted here.

In the mobile station according to one embodiment of the present invention described above, parameter values of a plurality of parameters are obtained by decoding the joint-encoded codeword in the received MIB. Therefore, in the radio communication system, it is possible to avoid deterioration of the performance of the mobile station while effectively reducing the load of the master information block. In addition, according to the mobile station of one embodiment of the present invention described above, even in different operation modes of the NB-IoT communication system, it is possible to receive the MIB of the same format transmitted from the base station.

The operations of the radio base station 400 and the mobile station 500 may be implemented with the above-described hardware, may be implemented with software modules that are executed on the processor, or may be implemented with combinations of both. The software module may be stored in any form of storage medium, such as RAM (random access memory), flash memory, ROM (read only memory), EPROM (erasable programmable ROM), EEPAROM (electrically erasable programmable ROM), registers, hard disk, removable disk and CD-ROM.

Such a storage medium is connected to a processor such that the processor can write information to or read information from the storage medium. Such storage medium may also be stacked in the processor. Such storage medium and processor may be arranged in the ASIC (Application Specific Integrated Circuit).

Such an ASIC may be arranged in the base station 400 and the mobile station 500. As an independent unit, such a storage medium and processor may be arranged at the base station 400 and the mobile station 500.

For example, the determining section, the coding section and the generation section in the base station 400 may be implemented through the processor (CPU). The receiving section at the mobile station 500 may include a receiving component such as an antenna array. Not that, as in the base station 400, the determining section in the mobile station 500 may be implemented through the processor (CPU).

As described above, the present invention has been described in detail by the above-described embodiment. However, it should be understood by those skilled in the art that the present invention is not limited to one embodiment described herein. The present invention may be implemented with examples modified or changed under the circumstances without departing from the scope of the present invention defined by the claims. Accordingly, the description in the specification is only intended to be interpreted as an illustration and does not add any restrictive meaning to the present invention.

This application is based on Chinese Patent Application No. 201610147071.3, filed on Mar. 15, 2016, including the specification, drawings and abstract, is incorporated herein by reference in its entirety.

The invention claimed is:

1. A base station comprising:
   a generation section that generates a master information block (MIB) including a parameter selected based on an operation mode during narrow band communication; and a transmission section that transmits the MIB, wherein
   the operation mode includes an in-band operation mode, a guard-band operation mode and a stand-alone operation mode, and
   only when the operation mode is the in-band operation mode and a physical cell indicator of an Narrow Band Internet of Thing (NB-IoT) system is different from a physical cell indicator of Long Term Evolution (LTE) system, the MIB includes a cell-specific reference signal (CRS) port parameter indicating a number of antenna ports of the CRS.

2. The base station according to claim 1, wherein, when the operation mode is the in-band operation mode and the physical cell indicator of the NB-IoT system is the same as the physical cell indicator of LTE, the MIB includes a CRS sequence parameter used to determine a sequence of the CRS.

3. The base station according to claim 2, wherein the CRS sequence parameter is used to derive a channel raster parameter indicating an offset frequency of a channel raster.

4. The base station according to claim 2, wherein the CRS sequence parameter represents an offset between a resource block for transmitting the MIB and a center frequency in a communication frequency band of the base station.

5. The base station according to claim 1, wherein, when the operation mode is the guard-band operation mode, or the operation mode is the in-band operation mode, and the physical cell indicator of the NB-IoT system is different from the physical cell indicator of LTE, the MIB includes a channel raster parameter indicating an offset frequency of a channel raster.

6. A mobile station comprising:
   a receiving section that receives a master information block (MIB) including a parameter selected based on an operation mode during narrow band communication; and a processor that controls the narrow band communication based on the parameter, wherein the operation mode includes an in-band operation mode, a guard-band operation mode and a stand-alone operation mode, and
   only when the operation mode is the in-band operation mode and a physical cell indicator of an Narrow Band Internet of Thing (NB-IoT) system is different from a physical cell indicator of Long Term Evolution (LTE) system, the MIB includes a cell-specific reference signal (CRS) port parameter indicating a number of antenna ports of the CRS.

7. A radio communication method in a base station, the method comprising the steps of:
   generating a master information block (MIB) including a parameter selected based on an operation mode during narrow band communication; and transmitting the MIB, wherein
   the operation mode includes an in-band operation mode, a guard-band operation mode and a stand-alone operation mode, and
   only when the operation mode is the in-band operation mode and a physical cell indicator of an Narrow Band Internet of Thing (NB-IoT) system is different from a physical cell indicator of Long Term Evolution (LTE) system, the MIB includes a cell-specific reference signal (CRS) port parameter indicating a number of antenna ports of the CRS.

8. The base station according to claim 3, wherein the CRS sequence parameter represents an offset between a resource block for transmitting the MIB and a center frequency in a communication frequency band of the base station.

9. The base station according to claim 2, wherein, when the operation mode is the guard-band operation mode, or the operation mode is the in-band operation mode, and the physical cell indicator of the NB-IoT system is different from the physical cell indicator of LTE, the MIB includes a channel raster parameter indicating an offset frequency of a channel raster.

10. The base station according to claim 3, wherein, when the operation mode is the guard-band operation mode, or the operation mode is the in-band operation mode, and the physical cell indicator of the NB-IoT system is different from the physical cell indicator of LTE, the MIB includes a channel raster parameter indicating an offset frequency of a channel raster.

11. The base station according to claim 4, wherein, when the operation mode is the guard-band operation mode, or the operation mode is the in-band operation mode, and the physical cell indicator of the NB-IoT system is different from the physical cell indicator of LTE, the MIB includes a channel raster parameter indicating an offset frequency of a channel raster.

* * * * *